(12) United States Patent
Moulsley et al.

(10) Patent No.: US 7,110,786 B2
(45) Date of Patent: Sep. 19, 2006

(54) METHOD FOR THE COMMUNICATION OF INFORMATION AND APPARATUS EMPLOYING THE METHOD

(75) Inventors: Timothy J. Moulsley, Caterham (GB); Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 594 days.

(21) Appl. No.: 09/933,790

(22) Filed: Aug. 21, 2001

(65) Prior Publication Data
US 2002/0028691 A1 Mar. 7, 2002

(30) Foreign Application Priority Data
Aug. 21, 2000 (GB) .................................. 0020599.7
Oct. 9, 2000 (GB) .................................. 0024699.1

(51) Int. Cl.
*H04B 7/00* (2006.01)

(52) U.S. Cl. ....................... 455/522; 455/69; 455/13.4; 455/127.1; 455/70; 455/226.1; 455/343.1; 455/507; 455/560; 455/561; 455/574

(58) Field of Classification Search ................ 455/522, 455/574, 507, 13.4, 69, 513, 526, 560, 561, 455/127.1, 70, 423, 226.1, 226.2, 226.3, 455/343.1
See application file for complete search history.

(56) References Cited

U.S. PATENT DOCUMENTS

| | | | |
|---|---|---|---|
| 5,898,740 A * | 4/1999 | Laakso et al. ............... | 375/346 |
| 5,926,747 A * | 7/1999 | Komara et al. .............. | 455/69 |
| 6,018,544 A * | 1/2000 | Kotzin et al. ................ | 375/148 |
| 6,285,886 B1 * | 9/2001 | Kamel et al. ................ | 455/522 |
| 6,427,072 B1 * | 7/2002 | Reichelt ..................... | 455/404.1 |
| 6,490,461 B1 * | 12/2002 | Muller ........................ | 455/522 |
| 6,571,103 B1 * | 5/2003 | Novakov ..................... | 455/464 |
| 6,587,672 B1 * | 7/2003 | Chuah et al. ................ | 455/69 |
| 6,738,640 B1 * | 5/2004 | Baker et al. ................. | 455/522 |

FOREIGN PATENT DOCUMENTS

WO     WO0019634     4/2000

OTHER PUBLICATIONS

By Matthew P.J. Baker & Timothy J. Moulsley; Entitled: Power Control in UMTS Release '99; Mobile Communication Technologies Conference Mar. 27th-29th, 2000, Published as International Conference on 3G2000, "Mobile Communication Technologies" Mar. 27th-29th, 2000 London UK, pp. 36-40.

* cited by examiner

*Primary Examiner*—Nay Maung
*Assistant Examiner*—Shaima Q. Aminzay
(74) *Attorney, Agent, or Firm*—Larry Liberchuk (57) ABSTRACT

A method and apparatus for transferring information over a communications link includes transmitting information at a first power level, monitoring for correct reception of the transmitted information and transmitting further information at a second, power level other than that used for the original transmission if correct reception did not occur. The further information allows the content of the originally transmitted information to be established and in one embodiment constitutes a retransmission of the originally transmitted information. By retransmitting at a different power level the probability of correct reception may be enhanced, especially when the communications link is wireless. The first and second transmission power levels are governed using closed loop power control such that transmission power level is controlled to achieve a required quality of reception parameter at the receiving end of the link. In one arrangement the quality or reception parameter is the signal-to-interference ratio.

33 Claims, 3 Drawing Sheets

METHOD FOR THE COMMUNICATION OF INFORMATION AND APPARATUS EMPLOYING THE METHOD

The present invention relates to digital communication systems and more particularly to the exchange of information over wireless digital communication links of varying quality. In comparison to links which are wired, a greater variation in quality is usually observed in wireless links, for example the radio links found in a cellular mobile radio telephone system between mobile telephones and basestations. The present invention relates in particular, but not exclusively, to code division multiple access (CDMA) systems as used in so called third generation mobile telecommunications systems such as the Universal Mobile Telecommunications System (UMTS).

Communication systems, including mobile telecommunication systems and networks are making increasing use of digital technology. Such networks require a wireless radio communication link to be established between a mobile terminal and a basestation (or fixed terminal). Second and third generation mobile telephone systems exchange digital signals over the wireless radio communications link.

Digital systems can be exploited to provide greater spectral efficiency of a radio communications link than is offered by an analogue system and digital processing can often minimise the effects of interference.

In communication systems that rely on wireless links, such as mobile communications systems, the quality of these links can vary considerably. A number of factors influence the quality of the link and the system must be tolerant of any such variation. In systems employing an analogue link, a reduction in link quality may merely result in a noisy but tolerable link being established. However, in systems employing a digital link, it is important that the information sent over the link can be faithfully recovered at the receiving end, even when the link quality is poor. The effect of incorrectly received information depends on the application. For example, in the case of a digital cellular mobile radio telephone system employing a wireless radio link, during a telephone conversation, incorrect reception and loss of information over the link may just result in a temporary muting of sound. However, with the advent of mobile computing, mobile telephone cellular networks are increasingly used for the communication of data and in this situation any loss of data is unacceptable.

Various techniques are known for assisting with correct communication of digital information over a range of media and some of these techniques fall into the category of error detection and correction. One technique is forward error correction (FEC) which involves encoding information prior to transmission in such a way that any errors occurring during communication may be identified and corrected on reception. Another technique is to employ an automatic repeat request (ARQ) error control scheme which involves the retransmission of information that is deemed to have been erroneously received or not received at all. There are various derivatives of the basic ARQ scheme and these are employed depending on the feasibility of providing buffer space at the transmit/receive ends of the link and the requirement to utilise the link efficiently. Indeed some ARQ schemes do not merely retransmit the same information. In the case of these schemes retransmission involves the (re) transmission of only a portion of the information, transmission of appropriate FEC information or any combination thereof. Various ARQ schemes are well known to the person skilled in the art, as is the fact that retransmission may be initiated in the absence of an acknowledgement that information has been received correctly or even incorrectly. This is in contrast to the situation where an explicit request for retransmission is sent to the transmitter. When FEC and ARQ techniques are combined they can provide a powerful error detection and correction mechanism and in certain implementations ARQ operation only becomes active if FEC fails to recover information. However both techniques are most effective when the quality of the link is more predictable and consistent as may be provided, for example, by a co-axial cable, although wired twisted pair links are susceptible to noise and interference. In contrast, wireless radio communication links, such as those employed between mobile terminals and fixed terminals have a link quality which is constantly changing due to, for example movement (should the terminal be mobile), obstructions caused by buildings, the geography of the area, weather conditions and the distance of the wireless link. The onset of interference can also affect the link quality. In particularly poor conditions ARQ techniques will result in multiple retransmissions occurring which may cause a delay in data communication and an overall increase in system power consumption. Where components of the system, for example mobile terminals, rely on battery power this is particularly undesirable.

Where the radio link quality deteriorates because of large signal fluctuations, for example at the onset of a deep fade, various prior art remedies have been proposed to deal with reception failure, including the measures of shifting down of transmission rates and increasing the overall transmission power.

In a radio system such as UMTS the main aim of providing an ARQ scheme is to maximise throughput, while minimising the use of system radio frequency (RF) resources such as power and duration of transmission. It is also desirable to minimise parameters such as interference caused to other users, end-to-end delay of transmissions, implementation complexity and additional consumption of network transmission capacity. These are all longstanding issues.

Published international patent application WO-A-00/19634 filed in the name of Koninklijke Philips Electronics N. V. describes an ARQ scheme where the transmission power level of re-transmitted information packets may be increased with respect to the transmission power level used for corresponding earlier (original) packet transmissions. The motivation for doing this is to reduce the probability of unsuccessful reception of the re-transmitted information packets. This allows information packets to be sent initially with a lower power level than would be the case in an arrangement not benefiting from this scheme, whilst still maintaining a given probability of packet reception failure overall. For this reason, it is also possible to reduce the total transmitted energy, that is, the sum of energy arising from the first transmission and any retransmissions. In certain cases this can mean a reduction of interference caused to other users. This scheme also reduces the probability of a large number of repeat transmissions occurring, which would constitute a sub-optimal manner of communication for a number of reasons, including delays in information transfer.

While the above scheme goes some way to providing an increase in the probability of correct data reception on retransmission whilst simultaneously seeking to regulate the interference caused to other users, it is an object of the present invention to improve on such operation, particularly with respect to CDMA systems such as UMTS.

In accordance with a first aspect of the present invention there is provided a method of transferring information in units over a wireless digital communications link between a transmitting station and a receiving station comprising the steps of:

transmitting first information units at a first power level;

monitoring if correct reception of the transmitted units occurred; and transmitting second information units associated with the first information units, for which first information units the monitoring did not indicate correct reception occurred, at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

The target quality of reception parameter for the second information units may be greater than the target quality of reception parameter for the first information units. Thus, by aiming to achieve reception of second information units possessing a quality of reception parameter superior to the quality of reception parameter of first information units, the probability of successful reception of the second information units is increased with respect to the probability of successful reception of the first information units. The raising of the target quality of reception parameter for the second information units is generally favoured where the first information units are discarded if received in error. In those arrangements where the received first information units are not so discarded when received in error, but combined with received second information units then the target quality of reception parameter for the second information units will not necessarily be greater than the target quality of reception parameter for the first information units.

The first information unit quality of reception parameter, which may be preset, can be chosen to achieve a required bit error rate or block error rate, or similar, in the traffic information received at the receiving station by virtue of first information units.

The quality of reception parameter may be the signal to interference ratio (SIR) of transmissions as received at the receiving station. In the case of a wireless link, such as a radio frequency link, such parameters can be established in terms of the received signal (radio signal) and are not necessarily considered in terms of transmission success of the actual information that is to be communicated. In order to determine such quality of reception parameters, it is possible to transmit specific information that is already known to the receiving station. The receiving station may then analyse the properties of such specific information in the form that it is actually received in order to assess the quality of the link. Such transmitted information is known as 'Pilot' information.

The preset (or target) quality of reception parameter may be compared with the actual quality of reception parameter of received information unit transmissions. If the quality of reception parameter for received information unit transmissions is greater than the target quality of reception parameter, then the information unit transmission power level may be decreased. Alternatively, if the quality of reception parameter for received information unit transmissions is less than the target quality of reception parameter, then the information unit transmission power level may be increased. In this way, it should be possible to maintain the quality of reception parameter that is necessary to achieve the required bit error rate or block error rate in the traffic information received at the receiving station. Simultaneously, because transmission power is being governed as a function of the received signal quality it should be possible to avoid the occurrence of high transmission powers that are in excess of required transmission power needed to obtain a given quality of reception parameter. This also limits undue levels of interference to other users. The step of comparing, or analysing, the difference (or disparity) between the actual and target quality of reception parameters of received information unit transmissions may be performed at the receiving station.

The information unit transmission power level may be directed by the receiving station.

Where the communications link is one that operates in accordance with a communications protocol based on the UMTS specification, the communications link may be established on at least one physical channel. In this case, the receiving station may send power regulation commands to the transmitting station in the transmit power control (TPC) field of a control channel.

The target quality of reception parameter for first information units may be selected to correspond to a defined probability of failed first information units transmission and consequent second information units transmission.

The content of the second information units may be the same as the content of the first information units. The units may be data frames or packets of data. The monitoring may be performed by the transmitting station based on information provided by the receiving station.

In accordance with a second aspect of the present invention there is provided a digital wireless communications system comprising at least one transmitter having means for transmitting first information units at a first power level;

at least one receiver having means for receiving the transmitted information units;

control means for controlling the transmitter output power; and monitoring means for monitoring if correct reception of the transmitted units occurred at the receiver, wherein the transmitting means transmits second information units associated with the first information units for which first information units the monitoring means does not indicate correct reception has occurred, the second information units being transmitted at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

The target quality of reception parameter for the second information units may be greater than the target quality of reception parameter for the first information units.

The content of the second information units may be the same as the content of the first information units.

The system may operate in accordance with a communications protocol based on the Universal Mobile Telecommunication System.

In accordance with a third aspect of the present invention there is provided a transmitter station for digital wireless transmission of traffic information to a receiver, said transmitter station having:

a transmitter for transmitting first information units at a first power level;

control means for controlling the transmitter output power; and monitoring means for monitoring if correct reception of the transmitted units occurred at the receiver, wherein the transmitter transmits second information units associated with the first information units for which first information units the monitoring means does not indicate correct reception has occurred, at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

The target quality of reception parameter for the second information units may be greater than the target quality of reception parameter for the first information units.

The control means may be responsive to control information originating from the receiver.

The content of the second information units may be the same as the content of the first information units.

The transmitter station may operate in accordance with a communications protocol based on the Universal Mobile Telecommunication System.

Other aspects and optional features appear in the appended claims which are incorporated herein by reference and to which the reader is now referred.

The invention will now be described by way of example only with reference to the accompanying drawings, wherein.

Figure 1:
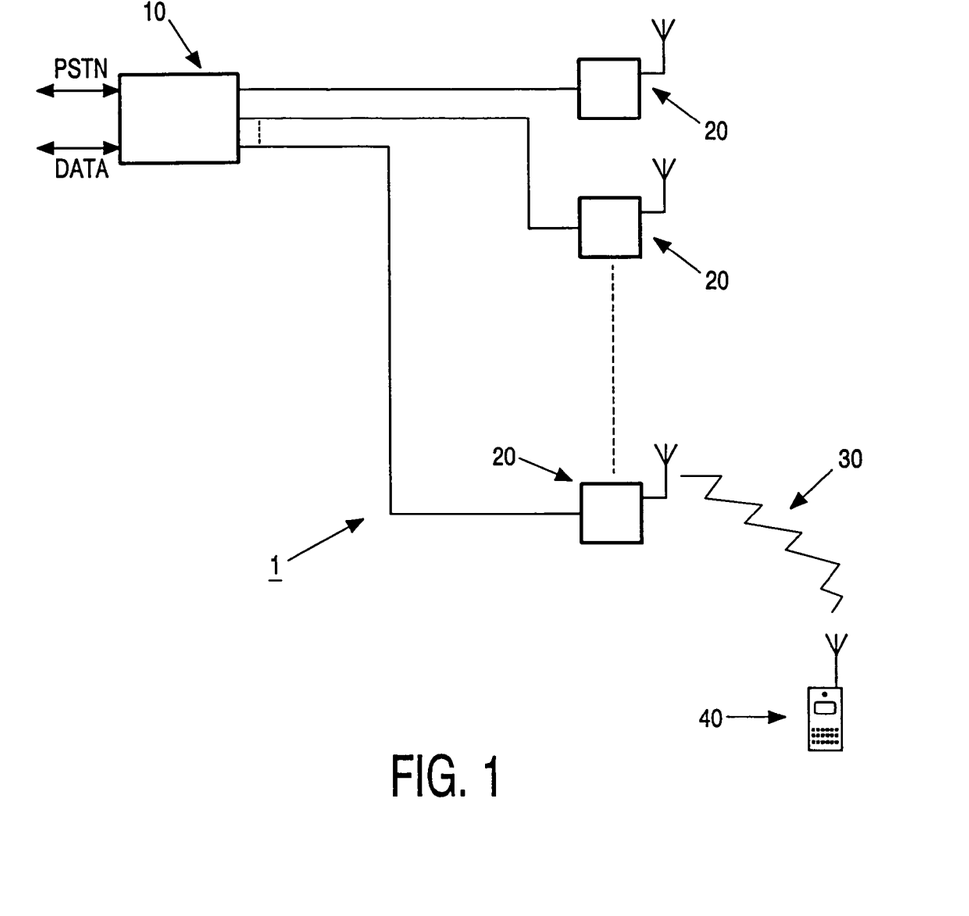
FIG. 1 is a schematic representation of a typical cellular mobile radio telephone communications system employing at least one wireless radio communications link.

Referring to FIG. 1, a communications system 1 in the form of a cellular mobile radio telephone system includes a switching center 10, which is connected to the public switched telephone network (PSTN) and to other data networks if required. The switching center is typically one of a number of switching centers and a number of basestations 20 are connected to each switching center. The main function of the basestations 20 is to establish a radio link 30 with a terminal 40, such as a mobile telephone, (or in the case of UMTS, the so-called user equipment (UE)), and therefore allow communication between the mobile terminal 40 and the rest of the system. Each basestation 20 is usually capable of supporting a plurality of such links 30 and therefore a plurality of mobile terminals 40. While the base stations 30 and the switching center 10 are shown as separate components, this is for illustrative purposes only and various functions may be performed by the switching center and/or base station depending on the implementation of the system, as will be appreciated by the person skilled in the art. A base station 20 is sometimes referred to as a fixed terminal, and in certain cases this terminology may be taken to include components such as the switching center 10 or at least such functional components associated with the switching center and other fixed infrastructure components. The basestation 20 and the terminals 40 are each provided with radio transmitting and receiving means for establishing the links 30. It is assumed that the radio link 30 is digital and furthermore may employ techniques such as Time Division Multiple Access (TDMA), Frequency Division Multiple Access (FDMA) or Code Division Multiple Access (CDMA).

In use, the quality of a link 30 established between the basestation 20 and the terminal 40 will vary considerably and the system must be tolerant of fluctuating link quality. Where digital information is being exchanged, as in the present example, this may result in the incorrect reception of digital information. Error correction techniques such as forward error correction (FEC) may be employed which can allow recovery of the correct information from the incorrectly received information. As the quality of the link 30 deteriorates further FEC techniques may not be adequate to recover the correct information and in this case there is no alternative but to initiate further transmissions for any incorrectly received information. These further transmissions may take a variety of forms although one practice is to employ ARQ schemes as mentioned earlier. In each case, regardless of the scheme chosen the further transmissions may be considered as the transmission of second information units that are associated in some way to (failed) previously transmitted first information units. As also mentioned above the further transmissions (of second information units) can involve a straightforward retransmission of information, (re)transmission of only a portion of the information, transmission of appropriate FEC information, transmission of enhanced FEC information or any reasonable combination thereof. However, for the purpose of illustrating the present invention, and by way of example only, the following specific description relates to a typical ARQ scheme where the transmission of second information units actually constitutes a repeat transmission of (failed) first transmission units.

Figure 3:
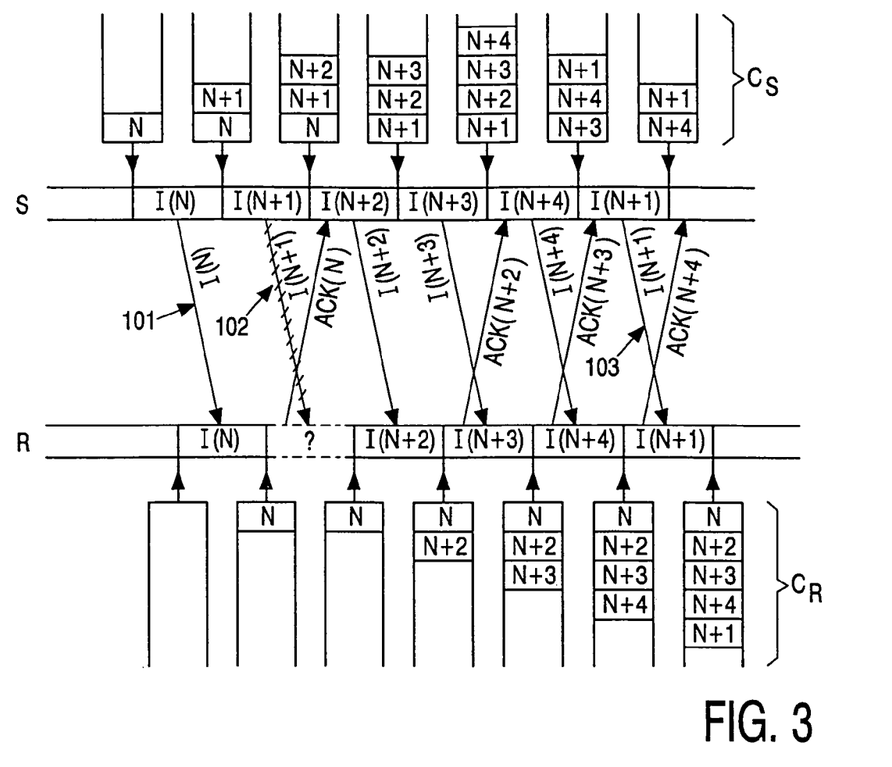
FIG. 3 illustrates the operation of a typical known automatic repeat request (ARQ) error control scheme.

The retransmission of information occurs without the intervention of a user and is therefore called an automatic repeat request (ARQ). By way of example only, a typical ARQ scheme may be understood by reference to FIG. 3 which shows the frame sequence of a so called selective RQ scheme ARQ implementation (where a frame is a unit of information transferred across the data link 30 of this example). This known scheme is discussed in more detail in the publication "Data Communications, Computer Networks and OSI" (second edition) at page 126–127 by Fred Halsall and published by the Addison-Wesley Publishing Company. Although information often flows in both directions across a link, FIG. 3 shows a situation where information is being sent from a sender (S) to a receiver (R) in the form of a number N of information frames I. Each transmitted frame contains a unique identifier which allows the sender S and the receiver R to keep track of individual frames. Both the sender and the receiver are provided with buffer storage space $C_S$ and $C_R$ respectively to record the frames that have been sent or received. When, for example, the frame I (N) denoted as 101 is transmitted by the sender S, this is recorded in the buffer $C_S$. Frames are sent continuously and the contents of $C_S$ form a (provisional) retransmission list. The receiver R returns an acknowledgement ACK to S for each correctly received frame and also records a list of correctly received frames in the buffer $C_R$. When the sender S receives acknowledgement ACK from the receiver R that a particular frame has been received correctly, sender S removes from the buffer $C_S$ the entry that corresponds to that acknowledged frame. Each I frame is coded to permit the receiver R to establish that the I frame is not corrupted. Various ways of doing this include the use of cyclic redundancy check (CRC) error checking. Now with further reference to FIG. 3, it is assumed that frame I (N+1) which is denoted as 102 becomes corrupted during transmission which is shown as a crossed line. This results in the absence of an acknowledgement for the I frame N+1 while acknowledgement ACK of the other illustrated frames N, N+2, N+3 . . . occurs normally. The sender S detects frame N+1 has not been acknowledged causing sender S to retransmit the frame as is denoted at 103. Depending upon the particular implementation of the ARQ scheme, subsequent retransmission may occur until correct receipt of a frame is acknowledged.

Where multiple retransmissions occur this can cause problems in certain systems. Firstly, multiple retransmissions may cause a significant delay. A second problem occurs in systems where large messages are transferred which are required to be broken into a number of frames. Because the frames must be reassembled in the correct order before the message can be recovered, this can require the use of large buffer storage space for temporary storage of frames received out of sequence. This is illustrated in the above example where frame (N+1) is retransmitted after transmission of frame (N+4). In order to recover the original message it is necessary for the receiver R to buffer the frames N+2, N+3 and N+4 which have been received out of sequence. Alternatively, or in addition to this buffering, the transmitter may buffer frames ready for retransmission.

Figure 4:
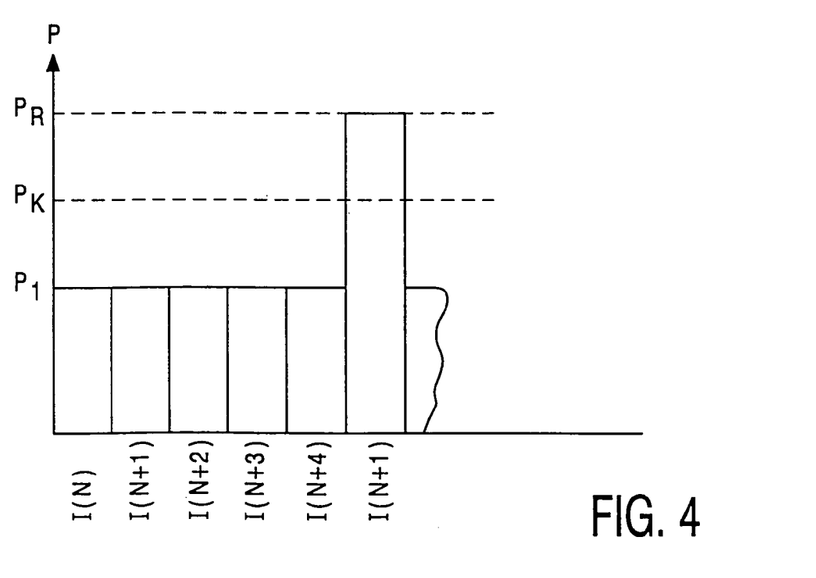
FIG. 4 illustrates the operation of an implementation of an error control scheme employing power control.

In data communication systems employing a physical link, such as a coaxial cable, incorrect transfer of information is frequently caused by spurious noise or collision of data, in which case simple retransmission of data is likely to be successful on the first attempt. However, in the case of a wireless communication link, such as that employed between a mobile terminal 40 and a basestation 20, incorrect transmission of information is often caused by a weak signal reaching the receiving end of the link. Furthermore this signal strength may be constantly varying due to a changing operating environment and in these situations a simple retransmission of incorrectly received information may be unsatisfactory. In this case, information that needs to be retransmitted may be sent over the link 30 with a transmission power that is greater than the transmission power used to transmit that information originally. This is illustrated in FIG. 4, which shows the same frame transmission sequence of FIG. 3 along the x-axis and transmission power on the y-axis. Frames are normally transmitted at power $P_1$ whereas retransmitted frames are transmitted at power $P_R$. This increases the probability of repeated information being successfully received on retransmission, especially under conditions where signal strength is weak or fading occurs. Furthermore the increased likelihood of successful communication resulting on the first retransmission allows a smaller buffer space to be employed in the transmitter and/or receiver for storing frames or a list of frames. The increased likelihood of successful communication resulting on the first retransmission can also result in reduced delay when sending the information, which is advantageous when carrying real time information such as video or audio. Benefits may also result when transmitting other types of information for which a transmission delay beyond a predetermined period is unacceptable. The power amplitude of the retransmitted frames (second information units) may, for example, be in the order of 3dB higher than the power amplitude used for the initial transmission of the frames (first information units) although other amplitudes may be chosen to give different relative powers and the above value is not intended to limit the scope of the present invention.

Figure 2:
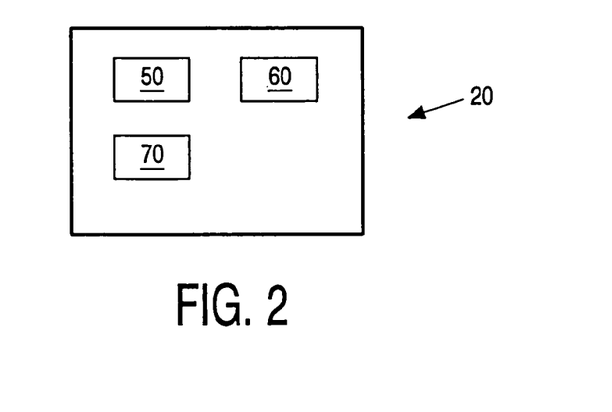
FIG. 2 is a schematic representation of components in a transmitter stage from the system of FIG. 1.

FIG. 2 shows components of the transmitter stage in a basestation 20 of the telecommunications system 1. A transmitter 50 transmits units of information as frames with a power that is governed by control means 60. In this example control means 60 is responsive to monitoring means 70. As stated above the transmitter 50 will output retransmitted information with a greater transmission power than the transmission power used to transmit that information originally. Although the transmitter 50, control means 60 and monitoring means 70 are shown together as components of the transmitter stage in the base station 20, this does not indicate a limitation. For example the monitoring means may be located away from the transmitter stage. In some cases the monitoring means may be located at the receiving end of the wireless link.

The above scheme allows retransmitted data to be successfully communicated with an increased level of confidence and this may be exploited in those applications where it is preferable that information should be successfully communicated by the first retransmission attempt. The transmission power levels for the first transmission attempt may be variable. For example it may be desirable to select this initial transmission power level $P_1$ such that a particular proportion of initial transmissions are likely to require retransmission (at the higher power level). Selection of the transmission power levels for the first transmission attempt will influence the proportion of retransmissions and thereby influence the average transmission power level. Lowering the initial transmission power will reduce the probability of information being successfully received. However, by using a low transmission power the power consumption of the transmitter will be reduced. The transmission power for the first attempt may in this way be used to control the average power consumption (which of course must take into account the transmissions at the higher power) of the transmitting circuitry, and preferably maintain a minimum average power consumption. Obviously, certain applications will be more tolerant than others to the occurrence of retransmissions and a balance needs to be established based on the relative importance of power saving versus the occurrence of retransmission. Indeed, excessive retransmission may give rise to a greater average power consumption than would occur if choosing to initially transmit at a higher power level thus reducing the number of retransmissions. The present arrangement is primarily intended for use in the transmission of traffic, which may for example be user video, voice, or file data and the requirements for transmitting various types of traffic will be known to the person skilled in the art. An overall reduction in transmission power reduces power consumption. This is of particular benefit when an exhaustible power source, such as a battery is being used. In certain implementations it may be desirable to impose a limitation on the number of retransmissions that are permitted in the interest of power saving and/or limiting transmission delay.

This power saving feature is also illustrated in FIG. 4. Information is initially transmitted at power $P_I$ which is below the power $P_k$ that would be used for transmission and retransmission in a system not benefiting from the present scheme. As will be noted, the re-transmitted information, in this case I frame (N+1), is re-transmitted at power $P_R$ which is greater than $P_1$. In this case, $P_R$ is also greater than $P_K$ although this is not mandatory. The reduction in overall power consumption may be exploited to provide a number of benefits such as extended operating time in the case of battery powered equipment, the use of smaller lighter batteries or the use of more economical battery technology.

In the receiver, the information actually received by virtue of each of the transmitted and associated re-transmitted frames may be combined in order to improve the probability of correct reception of the message carried by that information. Such combination may be done at the symbol level using maximum ratio combining (although other combination techniques may be used). Maximum ratio combining is where appropriate scaling factors are applied individually to each received frame of data when combining, so as to maximise the overall signal to noise ratio (or signal to interference ratio) of the combined information. For a given piece of information being communicated over a link, there will in general be a relationship between the total energy transmitted (that is the energy that is obtained by summing the transmit energy of the first frame and the transmit energy of each associated subsequent retransmitted frame) and the probability of correct reception. If it is desirable to minimise interference to other users of the system, the total energy of the transmissions should be controlled with the aim that no more energy is transmitted in total than is needed to receive the message correctly. One way of doing this is to select the initial transmission power on the basis of estimates of path loss and noise and interference at the receiver. Then if the first transmission fails, it can be arranged that the total energy is progressively increased with each subsequent re-transmission. Then, when the total energy actually received is sufficient to achieve the required SNR (or SIR), with those ratios being calculated for the initial transmission and associated retransmissions when combined overall, the information can be correctly decoded. As an example, consider the case where the total energy up to and including the nth transmission is set to be $E.k^{n-1}$, where E is the energy of the first transmission, and k is a constant. If the total energy is to increase, then k must be greater than unity. Then the energy of the nth transmission (for n>1) should be $E.k^{n-1}-E.k^{n-2}$. If k is close to one, then the total energy would be increased in small steps until the SNR (or SIR) is sufficient for correct reception. This means that there is a low probability of sending too much energy. In practice a large number of re-transmissions would undesirable, due to the required signalling overhead. Therefore, the choice of k would be a compromise between number of re-transmissions and the accuracy with which the required SNR can be reached, based on a knowledge of the likely errors in the estimates of the path loss and interference at the receiver. A suitable choice of k might be 1.4, in which case the sequence of relative energies for the first few transmissions would be approximately {1.0, 0.4, 0.6, 0.8, 1.2. . . . }.

The above scheme can be contrasted with the prior art, in which the retransmissions would be sent with equal power, so that the total energy after the nth transmission would be nE. This gives a relatively large step in total energy between the first and second transmissions, with progressively reducing energy increments subsequently.

It is mentioned for the avoidance of doubt that references to the term signal to noise ratio and signal to interference ratio are used interchangeably and reference to one of these terms may be taken to mean a reference to that term, a reference to the other one term or a combination of both such ratios.

The energy of a re-transmission could conveniently be determined by setting the transmit power, but other methods might be used for example by changing the modulation scheme, or spreading factor in a CDMA scheme, as described in our co-pending UK patent applications GB0020597.1 (applicants reference PHGB000115) filed on 21 Aug. 2000, and GB0024698.3 (applicants reference PHGB000140) filed on 9 Oct. 2000, both entitled "Method for the communication of information and apparatus employing the method". The methods might be used separately or in combination.

The above description relates primarily to a system in which any retransmitted information is substantially the same as in the first transmission. However, there are other possibilities. For example, the re-transmission may comprise additional redundancy. In this case it would be possible to arrange for the total amount of redundant information to progressively increase by a given amount. This is equivalent to a progressive decrease in the code rate. So if the effective code rate after the nth transmission is to be $R.k^{1-n}$, where R is the initial code rate, then the amount of additional redundancy to be added at the nth transmission should be $B.k^{n-1}-B.k^{n-2}$ where B is the total number of bits sent in the first transmission. If the same amount of additional redundancy in each re-transmission is the same as the number of bits in the first transmission, then the code rate at the nth transmission is R/n.

In some situations, for example with a fading channel and closed-loop power control, it may be beneficial to consider a parameter of the received signal energy instead of the transmit power. Specifically, the target SIR may be adjusted for each retransmission so as to give an exponential increase in total received signal energy according to a similar formula to that described above for the transmit energy, or the target SIR for each retransmission may be adjusted so as to give an exponential increase in total SIR.

A further technique may be applied in systems which employ simultaneous control and data channels. The closed loop power control and SIR target may apply to the control channel, with the transmit power for the data channel being determined by scaling from the transmit power of the control channel. In such situations, the scaling factor may be adjusted between each retransmission according to a similar formula to that described above. For example, if the scaling factor for the first transmission is S, then the scaling factor for the $n^{th}$ retransmission would be given by $S.k^{n-1}-S.k^{n-2}$.

It would also be possible to use a combination of these methods, for example adjusting the SIR target between retransmissions as well as adjusting the scaling of transmit power between the control and data channels.

Now that the basic concept of using a different transmission power for repeat transmissions has been explained, operation in accordance with the present invention is governed by the use of a closed loop power control. In a system with closed loop power control, such as UMTS when operating in the frequency division duplex (FDD) mode, it is proposed that transmission power, for the retransmissions at least, should be governed with reference to at least one parameter indicative of the quality of received transmissions at the receiving end of the link. One such parameter is the signal to interference (SIR) ratio. Transmission power may be adjusted as necessary such that the required SIR ratio (the 'target' SIR ratio) is achieved in transmissions detected by the receiver. In order to bring about a change in transmission power for repeat transmissions in comparison with original transmissions, it is possible to raise or lower the target SIR ratio at the receiver for any re-transmissions in comparison with the target SIR set at the receiver for the original transmissions. This change in target SIR setting may be done by explicit signalling between the fixed terminal and mobile terminal or under control of the physical layer. One procedure for setting the target SIR already exists, and is defined in the current version of the UMTS specification 3G TS25.433v3.2.0 "UTRAN Iub Interface NBAP signalling" section 8.2.17 the teaching of which is incorporated herein by reference.

In a system like UMTS, the transmit power levels of information carried on the control and data channels can be different. Therefore the power of data re-transmissions may also be effectively adjusted by changing the ratio of transmission power between the data information in the data channel and pilot information in the control channel. Furthermore, the received condition of pilot information which is transmitted as part of the control information may be used in power control operations.

In the case of a UMTS uplink (UL), a closed-loop power control procedure is employed for uplink Dedicated Channels (DCH). This procedure is specified in the current version of the UMTS specification 3GTS25.214v3.3.0 "Physical Layer Procedures (FDD)" section 5.1.2 the teaching of which is incorporated herein by reference. The procedure can be further subdivided into two processes which operate in parallel: outer-loop power control and inner-loop power control.

The outer-loop power control for the uplink operates within the base station (BS), and is responsible for setting a target SIR of transmissions as received at the BS from each UE. This target is set on an individual basis for each UE, according to the required BLock Error Rate (BLER) of the decoded data received from that UE. Generally, if it is required that the error rate of received, decoded data should be low, then it will be necessary for the SIR of received undecoded transmissions to be relatively high. In applications where a higher error rate in decoded data is permissible, it will be acceptable to receive transmissions having a lower SIR. The required BLER will depend on the particular service which is being carried, and therefore could, for example, be higher for a data service than for a voice service. The outer-loop power control will adjust the SIR target until the required BLER is matched. The SIR can be calculated by the reception of known pilot information.

The inner-loop power control mechanism controls the transmitted power of the UE in order to counteract the fading of the radio channel and meet the SIR target at the BS set by the outer-loop.

If the inner-loop power control fails to counteract adequately the fades in the channel, the BLER will increase and the outer-loop power control will increase the SIR target, so that the average received SIR from the UE is increased.

The BS compares the received SIR from the UE with the target once every time-slot (0.666ms). If the received SIR is greater than the target SIR, the BS transmits a TPC ("Transmit Power Control") command "0" to the UE via the downlink dedicated control channel. Such a command instructs the transmitter to reduce transmitting power. If the received SIR is below the target, the BS transmits a TPC command "1" to the UE. Such a command instructs the transmitter to increase transmitting power.

In the case of a UMTS downlink, inner and outer loop power control acts on dedicated channels in a similar way to the uplink.

Further information on uplink and downlink power control system employed in UMTS may be found in the paper entitled "Power control in UMTS release '99" M P J Baker, T J Moulsley IEE 3G2000 Mobile Communication Technologies Conference Mar. 27–29 2000 Mar. (London), published as International Conference on 3G 2000 "Mobile Communication Technologies", 27–29, Mar. 2000 London UK, pp 36–40, the teaching of which is incorporated herein by way of reference.

In a specific arrangement proposed here, the DSCH (Downlink Shared Channel) can be used to send packet data on the downlink. A pair of DCH (Dedicated Channels) would be used in uplink and downlink to support functions such as signalling and power control. If a packet is received in error by the UE, then the target SIR at the UE used by the downlink power control loop can be changed. The new SIR has the effect that the UE requests that the network (via closed loop inner power control) should transmit with a different power. This new target would apply until the packet is received correctly, at which point the target SIR could be restored to its original value.

Figure 5:
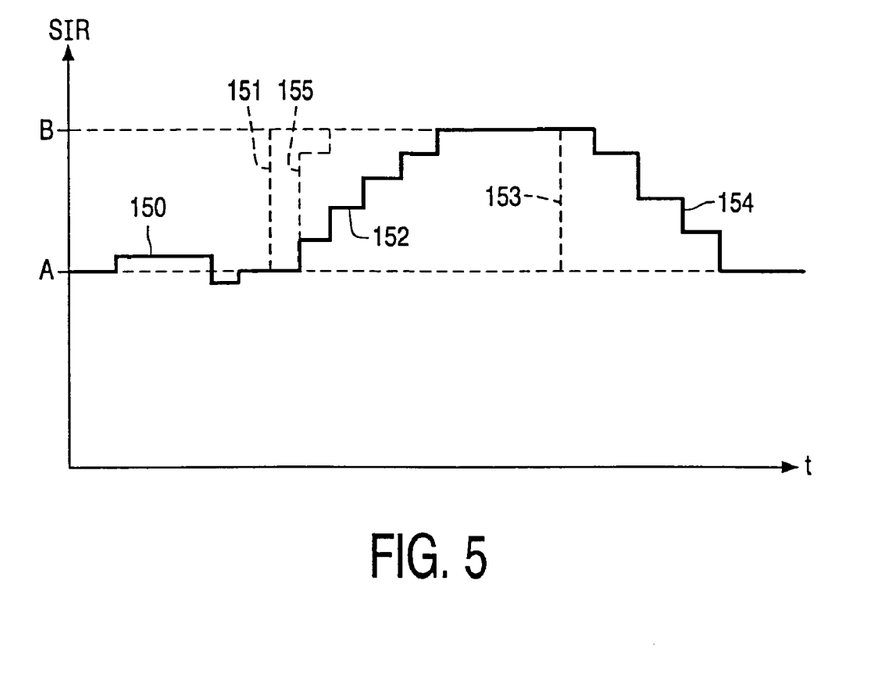
FIG. 5 shows transmission power with respect to time of apparatus operating in accordance with the present invention.

Such operation is illustrated in FIG. 5 which shows SIR on the y-axis versus time on the x-axis. The solid line 150 shows the received SIR value. For the first transmission of information units, the target SIR is set at value A. The actual received SIR value can fluctuate (for a number of reasons as have already been discussed above). In order to compensate for such fluctuations, the inner loop power control adjusts the transmission power in order to achieve the required SIR ratio A. In order to compensate for such fluctuations the closed loop power control is employed such that the receiver sends transmit power 'up' or power 'down' TPC commands to the transmitter such that the received SIR will be centered on the target SIR value A.

Now assuming that reception of first transmission units has failed, the receiver sends such an indication to the transmitter, which may be in the form of a negative acknowledgement command (NACK) or the lack of a positive acknowledgement command (ACK) depending on the form of ARQ scheme being used, as will be appreciated by the person skilled in the art. Consider the example of a scheme where the received first information units are discarded if received in error. The receiver also now raises the target SIR to a value B which is higher than the target SIR value A. This is denoted in FIG. 5 at 151. The SIR value of received transmissions is below the target SIR B which causes the receiver to send power 'up' commands to the transmitter, which commands are sent until the new target SIR B is reached. This is shown in FIG. 5 at 152. The higher target SIR B is maintained until the retransmission successfully communicates the failed data to the receiver. On acknowledgement of correct reception of the information units, the receiver sets the target SIR to the lower value A, as is denoted at 153. Since the SIR value of received transmissions is now above the target SIR, the receiver will send power 'down' commands to the transmitter, which commands are sent until the target SIR A is reached by the actual SIR value of received signals. This is shown in FIG. 5 at 154.

The same principle may be employed on the uplink communications. The change in SIR target may also be instructed or requested by the transmitting station.

Operation becomes be more complex if additional packets are sent before the erroneous one is re-transmitted, requiring the use of buffers and means for correctly sorting received packets of data. One way to simplify operation is to fix or restrict the delay of any re-transmissions, so that the target SIR could be raised at the correct time (or approximately the correct time).

If the first information units are not discarded, but are combined with any re-transmitted information, then the required quality target might become the SIR of the combination. Suitable combination techniques are already known, for example this may be done symbol-by-symbol or bit-by-bit using soft decision information. This required SIR target might therefore be reached with a lower power for the re-transmissions than the first transmission. In this case, the energy in the re-transmitted information would only need to be sufficient to make up the difference between the received SIR of the first transmission and the SIR target for correct reception.

In addition to the above mechanism of setting the target SIR and relying solely on the inner loop power control to cause a variation in transmission power, it may be possible to also apply an initial power change at the onset of re-transmissions, so that the new target SIR is reached more quickly. This is denoted in FIG. 5 as 155, which shows the new SIR value B being reached more quickly, relying on fewer inner loop power control cycles to reach the required SIR.

The above principle may also be applied to communications performed using other channels of the UMTS system, with appropriate modifications where necessary, as will be appreciated by the person skilled in the art.

The present invention may be implemented having regard to the requirements of the particular application. In applications where occasional transmission errors are tolerable it may be possible to reduce significantly the initial transmission power or quality of reception parameter (for example SIR target) causing a large reduction in the power consumption, placing reliance on the fact that successful transmission is likely on repeat transmission. In applications where a saving in power consumption needs to be balanced with the avoidance of unnecessary re-transmission, the initial transmission power is not reduced to the same extent.

Although the present invention is described with reference to a mobile cellular radio telephone system and so-called third generation mobile telecommunications systems, other applications include other cordless telephone systems and wireless LANs (for example Hiperlan), et cetera.

Variations on the basic scheme may include increasing the retransmission power or quality of reception parameter (for example SIR target) only after the first or a plurality of initial retransmission attempts have failed, thus providing greater scope for a reduction in power consumption.

Another variation on the basic scheme is to provide a progressive power increase for information that is retransmitted more than once. For example, the target SIR could be increased progressively until the information is successfully received. This further reduces the probability of unsuccessfully transmitted information being further delayed as a result of multiple retransmissions. In the general case there could be a pre-determined sequence of SIR values depending on the number of retransmissions. In some cases it may be desirable to limit the maximum allowable number of retransmission attempts for a given initial transmission.

The present invention may be used in conjunction with the concept of transmitting second transmission units on a carrier modulated with a modulation scheme different to the modulation scheme used for transmitting the first transmission units, which is the subject of our co-pending UK patent applications entitled "Method for the communication of information and apparatus employing the method", GB0020597.1 filed on 21, Aug. 2000 and GB0024698.3 filed on 9, Oct. 2000, each in the name of Koninklijke Philips Electronics N.V. applicants reference PHGB000115 and PHGB000140 respectively. Those applications also relate to the concept of changing spreading factor applied to data transmitted and to using a different communications link bandwidth between first and second information unit transmissions.

Whilst the present invention offers direct advantages in terms of reliable communication of information and a reduction in power consumption, other indirect advantages may be enjoyed through the correct implementation of the present invention. A lower initial (hence average) transmission power can result in reduced interference with other transmissions. An example of this in a cellular system would be observed as a reduction in overall co-channel interference (and a possible reduction in other types of interference) since the duration of the high power transmissions is relatively short. This can result in less interference to other users.

Although the present invention has been described with reference to known ARQ schemes this is not intended to indicate any limitation. As described the present invention may be primarily considered as a special ARQ scheme in which case the information is generally digital data organised into frames or packets. In this case the invention may be considered as an automatic repeat request error control scheme wherein transmitted data frames or packets which are deemed to have been unsuccessfully communicated are complemented with further transmissions at a power level different to the power used to transmit the data frames or packets originally, or aiming to achieve a quality of reception parameter (for example SIR ratio) greater than that achieved for the transmission of the data frames or packets originally. The present invention is also in keeping with techniques where first and subsequent transmissions or retransmissions may be combined to recover information. In such techniques it may be preferable to employ some type of averaging, and in this case may also be preferable to give more "weight" to information transmitted at a higher power or received with a higher quality of reception parameter. While the present invention will be of greatest use over a wireless radio link, it may also in principle be implemented in systems employing links of other mediums, for example co-axial cable, twisted pairs and so on, although the issue of power consumption is normally of minor importance in wired communication links. Furthermore, although the present invention has been described with reference to an example employing transmission between a fixed terminal and a portable terminal, it will be apparent to the person skilled in the art that the present invention is not so limited in application. That is the present invention may be employed in the transfer of information in either direction over a communications link or in both directions, irrespective of the fact that the transmitting station and/or receiving station is fixed or mobile. It will also be apparent to the person skilled in the art that in a two way communications system a transmitting station may be combined with a receiving station.

From reading the present disclosure, other modifications will be apparent to persons skilled in the art. Such modifications may involve other features which are already known in the design, manufacture and use of systems and devices and component parts thereof and which may be used instead of or in addition to features already described herein.

The invention claimed is:

1. A method of transferring information in units over a wireless digital communications link between a transmitting station and a receiving station comprising the steps of:
    transmitting first information units at a first power level selected to minimize the average power consumption of the transmitting station as a function of the first power level and power levels of possible retransmissions;

monitoring if correct reception of the transmitted units occurred; and transmitting second information units associated with the first information units, for which first information units the monitoring did not indicate correct reception occurred, at a second power level which is controlled on the basis of the disparity between target and actual quality of reception parameters for said second information units, wherein the target quality of reception parameter for said second information units is different to the target quality of reception parameter for said first information units, the second information units allowing The content of the first information units to be established.

2. The method of claim 1 wherein the target quality of reception parameter for the second information units is greater than the target quality of reception parameter for the first information units.

3. The method of claim 1, wherein the first information unit quality of reception parameter is chosen on the basis of a target bit error rate or block error rate in the information received at the receiving station by virtue of first information units.

4. The method of claim 1, wherein the quality of reception parameter is the signal to interference (SIR) ratio.

5. The method of claim 1, further comprising the step of analysing the disparity between the actual and target quality of reception parameters of received information unit transmissions and decreasing the information unit transmission power level if the quality of reception parameter for received information unit transmissions is greater than the target quality of reception parameter, otherwise increasing the information unit transmission power level if the quality of reception parameter for received information unit transmissions is less than the target quality of reception parameter.

6. The method of claim 1 wherein the communications link is established by equipment operating in accordance with a communications protocol based on the Universal Mobile Telecommunication System.

7. The method of claim 6 wherein the communications link is established on at least one physical channel.

8. The method of claim 7 wherein the receiving station sends transmission power regulation commands to the transmitting station in the transmit power control (TPC) field carried on a control channel set up in the communications link.

9. The method of claim 1, wherein the target quality of reception parameter for first information units is selected to correspond to a defined probability of failed first information units transmission and consequent second information units transmission.

10. The method of claim 1 wherein the second information unit transmissions are performed using an initial transmission power boost without reference to the quality of reception parameter.

11. The method of claim 1, wherein said target quality of reception parameter is increased from a first target level to a second target level when said first information units are not correctly received, so that said second information units are transmitted at said second power level which is greater than said first power level of said first information units.

12. The method of claim 11, wherein said target quality of reception parameter is decreased from said second target level to said first target level when said second information units are correctly received.

13. The method of claim 1, wherein said target quality of reception parameter is progressively increased.

14. The method of claim 1, wherein a change between said first power level and said second power level is progressive.

15. A digital wireless communications system comprising at least one transmitter having means for transmitting first information units at a first power level selected to minimize the average power consumption of the transmitter as a function of the first power level and power levels of possible retransmissions;

at least one receiver having means for receiving the transmitted information units;

control means for controlling the transmitter output power; and monitoring means for monitoring if correct reception of the transmitted units occurred at the receiver, wherein the transmitting means transmits second information units associated with the first information units for which first information units the monitoring means does not indicate correct reception has occurred, the second information units being transmitted at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

16. The communications system of claim 15 wherein the target quality of reception parameter for the second information units is greater than the target quality of reception parameter for the first information units.

17. The communications system of claim 15 wherein the second information unit transmissions are performed using an initial transmission power boost without reference to the quality of reception parameter.

18. The digital wireless communications system of claim 15, wherein said target quality of reception parameter is increased from a first target level to a second target level when said first information units are not correctly received, so that said second information units are transmitted at said second power level which is greater than said first power level of said first information units.

19. The digital wireless communications system of claim 18, wherein said target quality of reception parameter is decreased from said second target level to said first target level when said second information units are correctly received.

20. The digital wireless communications system of claim 15, wherein said target quality of reception parameter is progressively increased.

21. The digital wireless communications system of claim 15, wherein a change between said first power level and said second power level is progressive.

22. A transmitter station for digital wireless transmission of traffic information to a receiver, said transmitter station having:

a transmitter for transmitting first information units at a first power level selected to minimize the average power consumption of the transmitter as a function of the first power level and power levels of possible retransmissions;

control means for controlling the transmitter output power; and monitoring means for monitoring if correct reception of the transmitted units occurred at the receiver, wherein the transmitter transmits second information units associated with the first information units for which first information units the monitoring means does not indicate correct reception has occurred, at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

23. The transmitter station of claim 22 wherein the target quality of reception parameter for the second information units is greater than the target quality of reception parameter for the first information units.

24. The transmitter station of claim 22 wherein the second information unit transmissions are performed using an initial transmission power boost without reference to the quality of reception parameter.

25. The transmitter station of claim 22, wherein said target quality of reception parameter is increased from a first target level to a second target level when said first information units are not correctly received, so that said second information units are transmitted at said second power level which is greater than said first power level of said first information units.

26. The transmitter station of claim 25, wherein said target quality of reception parameter is decreased from said second target level to said first target level when said second information units are correctly received.

27. The transmitter station of claim 22, wherein said target quality of reception parameter is progressively increased.

28. The transmitter station of claim 22, wherein a change between said first power level and said second power level is progressive.

29. A receiver for use in a digital wireless communications system comprising at least one transmitter having means for transmitting first information units at a first power level selected to minimize the average power consumption of the transmitter as a function of the first power level and power levels of possible retransmissions, the receiver having means for receiving the transmitted information units;

control means for controlling the transmitter output power; and monitoring means for monitoring if correct reception of the transmitted units occurred at the receiver, wherein the transmitting means transmits second information units associated with the first information units for which first information units the monitoring means does not indicate correct reception has occurred, the second information units being transmitted at a second power level which is controlled on the basis of the disparity between target and actual quality of reception parameters for said second information units, wherein the target quality of reception parameter for said second information units is different to the target quality of reception parameter for said first information units, the second information units allowing the content of the first information units to be established.

30. The receiver of claim 29, wherein said target quality of reception parameter is increased from a first target level to a second target level when said first information units are not correctly received, so that said second information units are transmitted at said second power level which is greater than said first power level of said first information units.

31. The receiver of claim 30, wherein said target quality of reception parameter is decreased from said second target level to said first target level when said second information units are correctly received.

32. The receiver of claim 29, wherein said target quality of reception parameter is progressively increased.

33. The receiver of claim 29, wherein a change between said first power level and said second power level is progressive.

* * * * *